(12) United States Patent
Schreiner

(10) Patent No.: US 8,212,682 B2
(45) Date of Patent: Jul. 3, 2012

(54) METHOD AND DEVICE FOR EASILY MONITORING THE MAINTENANCE STATUS OF AN UV-DRINKING WATER DISINFECTION SYSTEM IN AN AIRCRAFT

(75) Inventor: Axel Schreiner, Bremen (DE)

(73) Assignee: Airbus Operations GmbH (DE)

( * ) Notice: Subject to any disclaimer, the term of this patent is extended or adjusted under 35 U.S.C. 154(b) by 413 days.

(21) Appl. No.: 12/573,990

(22) Filed: Oct. 6, 2009

(65) Prior Publication Data

US 2010/0090840 A1    Apr. 15, 2010

Related U.S. Application Data

(60) Provisional application No. 61/195,830, filed on Oct. 10, 2008.

(30) Foreign Application Priority Data

Oct. 10, 2008    (DE) .......................... 10 2008 051 239

(51) Int. Cl.
*G08B 21/00*    (2006.01)
*G01J 1/08*    (2006.01)

(52) U.S. Cl. ..................... 340/619; 340/618; 250/341.7; 250/343

(58) Field of Classification Search .................. 340/600, 340/618, 619; 210/96.1, 143, 745, 748.08, 210/748.09, 748.11; 250/341.7, 343, 345, 250/373, 455.11
See application file for complete search history.

(56) References Cited

U.S. PATENT DOCUMENTS

| | | | | |
|---|---|---|---|---|
| 3,652,850 A | * | 3/1972 | Briggs | 250/341.7 |
| 4,304,996 A | * | 12/1981 | Blades | 250/373 |
| 6,117,335 A | * | 9/2000 | Bender | 210/745 |
| 6,200,466 B1 | * | 3/2001 | Bender | 210/96.1 |
| 6,791,092 B2 | * | 9/2004 | Hamilton | 250/373 |
| 2003/0030011 A1 | * | 2/2003 | Brown et al. | 250/455.11 |
| 2003/0147770 A1 | * | 8/2003 | Brown et al. | 422/24 |
| 2005/0242013 A1 | * | 11/2005 | Hunter et al. | 210/143 |
| 2007/0092976 A1 | * | 4/2007 | Watson et al. | 436/181 |

FOREIGN PATENT DOCUMENTS

| | | |
|---|---|---|
| EP | 1130381 A1 | 9/2001 |
| WO | 2008050349 A2 | 5/2008 |
| WO | 2008080181 A1 | 7/2008 |

* cited by examiner

*Primary Examiner* — Van T. Trieu
(74) *Attorney, Agent, or Firm* — Lerner, David, Littenberg, Krumholz & Mentlik, LLP

(57) ABSTRACT

A disinfection system for liquids is provided that features an irradiation chamber for accommodating a liquid to be disinfected. A UV-radiator with a cladding that is transparent to UV-light is arranged in the irradiation chamber such that the UV-radiation emitted by the UV-radiator may penetrate the liquid. A first UV-sensor is arranged in the irradiation chamber such that a first attenuation characteristic with respect to the UV-light emitted by the UV-radiator may be measured with the first UV-sensor, wherein the first attenuation characteristic comprises a first aging characteristic and a first liquid attenuation characteristic. A second UV-sensor is arranged in the irradiation chamber such that a second attenuation characteristic with respect to the UV-light emitted by the UV-radiator may be measured with the second UV-sensor, wherein the second attenuation characteristic comprises a second aging characteristic and a second liquid attenuation characteristic and differs from the first attenuation characteristic.

15 Claims, 11 Drawing Sheets

METHOD AND DEVICE FOR EASILY MONITORING THE MAINTENANCE STATUS OF AN UV-DRINKING WATER DISINFECTION SYSTEM IN AN AIRCRAFT

CROSS-REFERENCE TO RELATED APPLICATIONS

This application claims the benefit of the filing date of U.S. Provisional Patent Application No. 61/195,830 filed Oct. 10, 2008, the disclosure of which is hereby incorporated herein by reference.

FIELD OF THE INVENTION

The present invention relates to a disinfection system for liquids that is based on UV-radiation. Particularly, the invention relates to a disinfection system for liquids, a method for disinfecting liquids and an aircraft with a disinfection system.

BACKGROUND OF THE INVENTION

Disinfecting means killing or inactivating pathogenic organisms and may be achieved by UV-irradiation in the wavelength range between 200 and 300 nm. Pathogenic microorganisms may cause diseases, particularly in humans. The germicidal effect of short-wave UV-radiation is based on the absorption of this radiation by nucleic acids (DNA, RNA) in the cell nucleus of the microorganisms. UV-radiation in the wavelength range of approximately 260 nm has the highest absorption rate. In the cell nucleus, this UV-C radiation causes a photochemical reaction that alters the nucleic acid structure of the microorganisms. Cell division and progeny are now no longer possible. UV-C radiation therefore makes it possible to reliably sterilize liquids, particularly drinking water. Depending on the radiation intensity, germs may be reduced by up to 99.999. In order to achieve a sufficient germ reduction for drinking water, for example, DVGW W294 specifies that the radiation dose acting upon the liquid to be sterilized must not fall below 400 J/m$^2$.

WO 2008/050349 A2 describes an UV-disinfection system for liquids with installed monitoring options, wherein a water line features a wall that is at least partially transparent to UV-light and a light detector that is arranged in the vicinity of the light source in order to measure the light generated by the light source.

Such an UV-disinfection system consists of an irradiation chamber, through which the liquid to be sterilized, particularly drinking water, is conveyed and of one or more UV-radiators that are usually arranged in a cladding tube that is transparent to UV-light and protects the radiators from the liquid. The cladding tube usually consists of a silica glass. In order to monitor the required UV-radiation intensity, one or more UV-sensors are arranged in the irradiation chamber.

Especially, drinking water may lower the transmittance for UV-radiation due to its chemical-physical parameters such as, for example, its turbidity, hardness and/or content of suspended matter, iron, manganese and humic acid. These chemical-physical parameters depend on the source, from which the drinking water is obtained. These water ingredients may also soil the UV-disinfection system or lead to deposits on the cladding tubes.

The attainable UV-radiation intensity in the irradiation chamber therefore is essentially dependent on three factors. The first factor is the power of the UV-radiator and its state of aging based on the hours of operation, the second factor is the cleanliness or the maintenance status of the cladding of the UV-radiator that surrounds the UV-radiator, and the last factor is the effective water quality with respect to its ingredients, particularly its UV-transmittance that represents the transparency to UV-light at a certain wavelength.

Particularly in the mobile use of UV-disinfection systems such as, for example, in aircraft, buses, rail vehicles or ships that obtain the drinking water intended for disinfection from different sources, reliable information on the maintenance status of the UV-radiator/cladding combination may usually not be obtained based on a measured value of a UV-sensor due to the changing UV-transmittance of the drinking water.

BRIEF SUMMARY OF THE INVENTION

There may be a need for providing an UV-disinfection system for liquids that monitors the maintenance status of the UV-radiator/cladding combination regardless of the UV-transmittance of the liquid to be disinfected.

According to an exemplary embodiment of the invention, a disinfection system for liquids comprises an irradiation chamber for accommodating a liquid to be disinfected. A UV-radiator with a cladding that is transparent to UV-light is arranged in the irradiation chamber in such a way that UV-radiation emitted by the UV-radiator may penetrate the liquid to be disinfected. In addition, a first UV-sensor is arranged in the irradiation chamber in such a way that a first attenuation characteristic with respect to the UV-light emitted by the UV-radiator may be measured with the first UV-sensor, wherein the first attenuation characteristic includes a first aging characteristic and a first liquid attenuation characteristic. Furthermore, a second UV-sensor is arranged in the irradiation chamber in such a way that a second attenuation characteristic with respect to the UV-light emitted by the UV-radiator may be measured with the second UV-sensor, wherein the second attenuation characteristic includes a second aging characteristic and a second liquid attenuation characteristic that differs from the first attenuation characteristic.

Due to this arrangement of the first and the second UV-sensor, it is possible to determine the radiation intensity of the UV-light at the boundary layer between the liquid to be disinfected and a deposit on the UV-radiator or, if no deposit is present, the cladding of the UV-radiator. The cladding of the UV-radiator may consist, for example, of a cladding tube with a UV-radiator, for example, of tubular design arranged therein or of the enveloping body of the UV-radiator itself. If the UV-radiator is realized in the form of a mercury vapor lamp of tubular design, for example, the enveloping body would be the tube that surrounds the gas. For the purpose of the invention, the term cladding also includes a window with a pane that separates the irradiation chamber from the UV-radiator, wherein the pane consists of material that is transparent to UV-light and may be plane or curved. In this arrangement, the UV-radiator is usually situated outside the irradiation chamber.

Therefore, two different attenuation characteristics of the UV-light emitted by the UV-radiator may be measured by the two sensors, wherein these attenuation characteristics make it possible to determine the radiation intensity emitted from the cladding of the UV-radiator that may possibly be coated with a deposit regardless of the chemical-physical parameters of the liquid to be disinfected such as, for example, drinking water. The determined radiation intensity provides information on the maintenance status of the UV-radiator with its cladding.

The first UV-sensor and the second UV-sensor may be arranged in the irradiation chamber in such a way that either one of the two UV-sensors or both UV-sensors may be surrounded by the liquid to be disinfected.

Consequently, maintenance plans that are based on the current status of the UV-radiator/cladding combination may be prepared for disinfection systems that disinfect with UV-radiators and are supplied with water of different water qualities such that these disinfection systems may be purposefully maintained.

For the purpose of the invention, the term aging characteristic not only refers to the diminishing UV-light intensity due to the operation of the UV-radiator, but also other characteristics that diminish the UV-radiation intensity only temporarily or permanently such as, for example, deposits on the surface of the cladding, turbidities, material defects such as inclusions, etc.

According to another embodiment of the invention, the first UV-sensor is spaced apart from the cladding of the UV-radiator by a first distance and the second UV-sensor is spaced apart from the cladding of the UV-radiator by a second distance in the disinfection system, wherein the first distance differs from the second distance such that a difference between the first and the second attenuation characteristic may be determined.

Since the UV-light that is possibly attenuated by a deposit travels a distance to the sensor surface of the first UV-sensor that differs from the distance to the sensor surface of the second UV-sensor, it is also attenuated differently by the chemical-physical parameters of the water to be disinfected. The UV-sensor that is spaced apart from the cladding by the greater distance therefore is also not illuminated as intensely as the UV-sensor with the shorter distance.

According to another embodiment of the invention, the first UV-sensor has a first optical axis and the second UV-sensor has a second optical axis in the disinfection system, wherein the first optical axis is directed at the cladding of the UV-radiator with a first angle and the second optical axis is directed at the cladding of the UV-radiator with a second angle, and wherein the first angle differs from the second angle and the distance of the first UV-sensor from the cladding of the UV-radiator along the first optical axis differs from the distance of the second UV-sensor from the cladding of the UV-radiator along the second optical axis such that the difference between the first and the second attenuation characteristic may be determined.

If the first and the second UV-sensor are spaced apart from the cladding by the same orthogonal distance, for example, a different distance to be traveled by the UV-light from the cladding that may possibly contain a deposit to the sensor surface is realized due to the fact that the optical axes are aligned relative to the cladding with a different angle. Consequently, the UV-sensor that is directed at the cladding with a more acute angle is also illuminated differently.

The first and the second UV-sensor naturally may also be spaced apart from the cladding by different orthogonal distances.

According to another embodiment of the invention, the cladding of the UV-radiator of the disinfection system has a straight and a curved region, wherein the first UV-sensor is directed to the straight region and the second UV-sensor is directed to the curved region such that the difference between the first and the second attenuation characteristic may be determined.

The term one-dimensional curvature refers, for example, to the surface of a straight tube and the term two-dimensional curvature refers to the surface of a bent tube. If the first and the second UV-sensors are spaced apart from the different surfaces by the same distance, for example, the second UV-sensor that is directed to the one-dimensionally or two-dimensionally curved region covers a larger surface of the cladding of the UV-radiator than the UV-sensor that is directed to the plane region. Consequently, the second UV-sensor is illuminated differently from the first UV-sensor.

According to another embodiment of the invention, the cladding of the UV-radiator of the disinfection system has a one-dimensionally and a two-dimensionally curved region, wherein the first UV-sensor is directed to the one-dimensionally curved region and the second UV-sensor is directed to the two-dimensionally curved region such that the difference between the first and the second attenuation characteristic may be determined. As already mentioned in the preceding paragraph, the second UV-sensor is also illuminated differently from the first UV-sensor in this case.

According to another embodiment of the invention, the first UV-sensor of the disinfection system has a first measuring field angle and the second UV-sensor of the disinfection system has a second measuring field angle, wherein the first measuring field angle differs from the second measuring field angle such that the difference between the first and the second attenuation characteristic may be determined.

In this case, the first and the second UV-sensor may also be spaced apart from the cladding of the UV-radiator by the same distance. In this arrangement, the UV-sensor with the larger measuring field angle covers a different region than the sensor with the smaller measuring field angle. Consequently, the two UV-sensors are illuminated with different intensities.

All arrangements of the first and the second UV-sensor described with reference to the preceding embodiments naturally may also be combined with the sensors with different measuring field angles.

According to another embodiment of the invention, the disinfection system furthermore comprises a measuring device that is designed for determining the light intensity of the light emitted by the UV-radiator.

This measuring device may consist, in principle, of a UV-sensor that is arranged on the cladding such that the liquid to be disinfected may not surround the cladding at this location. However, it would also be conceivable to use different measuring devices such as, for example, a spectroscope, a device for monitoring the voltage-current curve of the UV-radiator or a device for monitoring the heat development at the electrodes of the UV-radiator.

According to another embodiment of the invention, the disinfection system furthermore comprises a control device with an evaluation unit, wherein the evaluation unit is designed for determining an outgoing radiation intensity due to measured values provided by the first and the second UV-sensor, wherein the radiation intensity is originated from the cladding of the UV-radiator that may possibly be coated with a deposit. The determination of the outgoing radiation intensity may naturally also take place in real time.

The UV-transmission of the respective liquid to be disinfected naturally may also be determined by the evaluation unit.

The radiation intensities determined by the evaluation unit may also be recorded. The maintenance time consequently may be determined based on the resulting diagram. A periodic maintenance within fixed time intervals consequently may be eliminated.

The control device may possibly also display the determined radiation intensity.

According to another embodiment of the invention, the evaluation unit of the control device of the disinfection system comprises a storage unit, wherein a set of characteristic curves for determining the radiation intensity originating from the cladding of the UV-radiator that may possibly be coated with a deposit is stored in said storage unit.

The set of characteristic curves contains curves that were determined for the device in dependence on the UV-transmission of the liquid to be disinfected and in dependence on the radiation intensity emitted by the UV-radiator/cladding combination. During the operation, the UV-radiation intensity that currently originates from the UV-radiator/cladding combination may be deduced from the current measured values of the first and the second UV-sensor based on the stored curves of the set of characteristic curves.

If a mathematical model such as, for example, Lambert-Beer's law is stored instead of the empirically determined set of characteristic curves, the UV-radiation originating from the cladding with the respective deposit situated thereon may be determined computationally from the measured values transmitted by the two UV-sensors. For this purpose, the first distance parameter of the first UV-sensor from the UV-radiator/cladding combination and the second distance parameter of the second UV-sensor from the UV-radiator/cladding combination is determined during a calibration of the disinfection system, wherein the irradiation chamber is filled with a liquid of known UV-transmission and the UV-radiator/cladding combination emits a predetermined UV-radiation intensity during said calibration. These distance parameters that were determined by calibration may differ from the geometric distances between the respective UV-sensors and the UV-radiator/cladding combination.

According to another embodiment of the invention, the control device of the disinfection system is designed in such a way that a UV-radiator arrangement may be controlled and switched.

In order to extend the maintenance intervals and to simultaneously disinfect larger quantities of liquid, it is possible to arrange several UV-radiators in a disinfection system. When disinfecting a liquid with a high UV-transmittance, it would consequently be possible, for example, to operate only selected UV-radiators or to operate the UV-radiators with reduced power. When disinfecting liquids with a low UV-transmittance, it would analogously be possible to ensure a minimum irradiation, for example, by switching on one or more additional UV-radiators.

According to another embodiment of the invention, the evaluation unit of the control device of the disinfection system is designed in such a way that the radiation intensity of each UV-radiator of the UV-radiator arrangement that comprises a cladding with a possible deposit situated thereon may be determined by the measured values of the first and the second UV-sensor.

In this case, the first and the second UV-sensor may be arranged in such a way that conclusive information on the radiation intensity reached by the UV-radiator that comprises a cladding with a possible deposit situated thereon may be obtained regardless of the fact which UV-radiator is operated.

According to another embodiment of the invention, the control device of the disinfection system comprises a warning device in order to generate a warning signal if the radiation intensity of the UV-radiator that comprises a cladding with a possible deposit situated thereon falls below a pre-adjusted value.

This warning device may also be coupled to a shut-off mechanism, for example, for the water supply such that the delivery of drinking water that may possibly be contaminated with pathogenic microorganisms may be prevented.

According to another embodiment of the invention, the evaluation unit of the control device of the disinfection system is designed for determining the UV-attenuation of the deposit situated on the cladding of the UV-radiator based on the measured values generated by the first UV-sensor and the second UV-sensor and a measured value generated by a measuring device.

Due to the incorporation of the light intensity of the UV-radiator that is determined by the measuring device, it is possible to obtain conclusive information on whether the UV-radiator needs to be replaced and/or the cladding needs to be replaced or cleaned during the maintenance process. Naturally, the outgoing radiation intensity originating from a cladding with a possible deposit situated thereon may also be determined by the evaluation unit in real time based on the measured values of the first UV-sensor and the second UV-sensor.

All characteristics described above and below with respect to the functional aspects of the disinfection system may also be implemented in the method for disinfecting liquids and vice versa.

According to another embodiment of the inventive method for disinfecting liquids for an aircraft, the liquid to be disinfected is introduced into an irradiation chamber, in which a first UV-sensor and a second UV-sensor, as well as a UV-radiator in a cladding that is transparent to UV-light, are arranged such that the surface of the cladding is surrounded by the liquid to be disinfected. Furthermore, a first measured value with respect to a first attenuation characteristic is determined by the first UV-sensor, wherein the first attenuation characteristic with respect to the UV-light emitted by the UV-radiator is caused by the liquid to be disinfected. In this case, the first attenuation characteristic comprises a first aging characteristic and a first liquid characteristic. In addition, a second measured value with respect to a second attenuation characteristic is determined by the second UV-sensor, wherein the second attenuation characteristic with respect to the UV-light emitted by the UV-radiator is caused by the liquid to be disinfected. In this case, the second attenuation characteristic comprises a second aging characteristic and a second liquid characteristic, wherein the second attenuation characteristic differs from the first attenuation characteristic. Subsequently, the first and the second measured value are evaluated in order to determine the first or second aging characteristic.

The first and the second aging characteristic may also be identical.

According to another embodiment of the invention, a disinfection system of the above-described type is used in an aircraft.

The central idea of the invention consists of respectively eliminating the attenuation influence of a liquid to be disinfected on the light emitted by a UV-radiator from an overall absorption by, e.g., two UV-sensors in a different geometric configuration in order to subsequently deduce the currently emitted UV-radiation intensity that may possibly be diminished due to deposits and radiator aging.

Other details can be gathered from the dependent claims in connection with the description of one embodiment that is elucidated in detail with reference to the drawings.

DETAILED DESCRIPTION

It should first be mentioned that identical components are identified by the same reference symbols in the figures and that the drawings are merely schematic and not necessarily true-to-scale.

Figure 1:
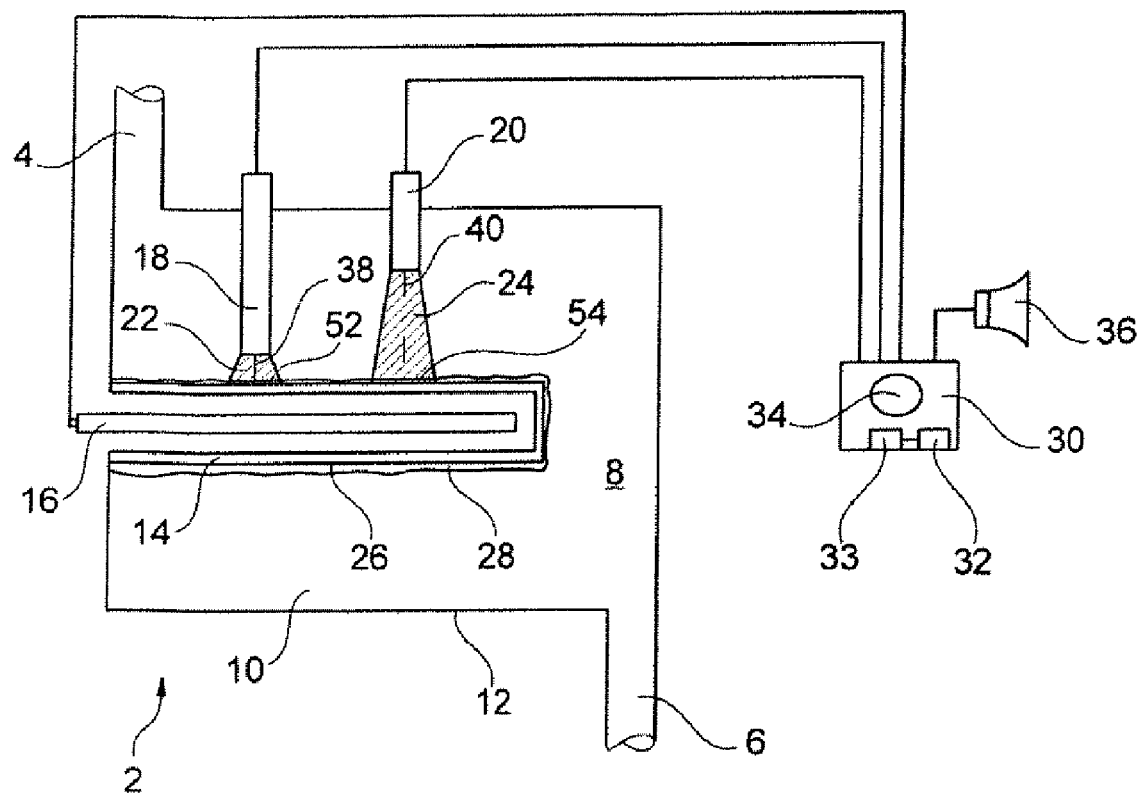
FIG. 1 shows an inventive disinfection system in the form of a schematic representation, FIG. 2 schematically shows a second arrangement of two UV-sensors relative to the cladding of a UV-radiator, FIG. 3 schematically shows a third arrangement of two UV-sensors relative to the cladding of a UV-radiator, FIG. 4 schematically shows a fourth arrangement of two UV-sensors relative to the cladding of a UV-radiator, FIG. 5 schematically shows a fifth arrangement of two UV-sensors relative to the cladding of a UV-radiator, FIG. 6 schematically shows an exemplary arrangement of two UV-sensors relative to several claddings of UV-radiators that are arranged on top of one another, FIG. 7 schematically shows an exemplary arrangement of two UV-sensors relative to claddings of UV-radiators that are arranged opposite of one another.

FIG. 1 shows a schematic representation of an inventive disinfection system 2 with an inlet 4 and an outlet 6 for liquids 8 to be disinfected. In the present embodiment, the liquid 8 to be disinfected consists of drinking water. The disinfection system 2 comprises an irradiation chamber 10 that is surrounded by a wall 12 that is impervious to UV-light. A cladding 14 of UV-transparent silica glass is arranged in the irradiation chamber 10, wherein the UV-radiator 16 is situated in said cladding. Furthermore, a first 18 and a second UV-sensor 20 are arranged in the irradiation chamber 10 in such a way that the first UV-sensor 18 is spaced apart from the cladding 14 by a first distance 38 and has a first conical range of vision 22 and the second UV-sensor 20 is spaced apart from the cladding 14 by a second distance 40 and has a second conical view of vision 24. The UV-sensors 18, 20 are arranged adjacent to one another in a parallel fashion, but spaced apart from the cladding 14 by different distances 38, 40. Consequently, the conical ranges of vision 22, 24 cover different areas 52, 54 on the surface of the cladding 14. The surface 26 of the cladding 14 may contain a deposit 28. The deposit 28 is detected accordingly in the two conical ranges of vision 22, 24 of the UV-sensors 18, 20. The two UV-sensors 18, 20, as well as the cladding 14, are arranged in the irradiation chamber 10 in such a way that the cladding 14 may be surrounded by the drinking water 8 to be disinfected and the two UV-sensors 18, 20 are immersed in the drinking water 8 to be disinfected.

According to an exemplary embodiment, the two UV-sensors 18, 20, as well as the UV-radiator 16, are connected to a control device 30. The control device 30 contains an evaluation unit 32. This evaluation unit may calculate the radiation intensity originating from the deposit 28 in dependence on measured values determined by the two UV-sensors 18, 20. For this purpose, the evaluation unit 32 accesses a storage unit 33, in which a set of characteristic curves is stored. The control device 30 may switch and control the UV-radiator 16, for example, with respect to the voltage to be supplied to the UV-radiator 16 based on the values calculated by the evaluation unit 32 in connection with the set of characteristic curves. This control makes it possible to achieve a higher radiation intensity of the UV-radiator 16. The UV-radiator 16 is connected to a not-shown power supply. According to an exemplary embodiment, the control device 30 is provided with a display 34 that may display measured values or values calculated by the evaluation unit 32. In addition, the control device 30 is connected to a warning device 36 that outputs a warning signal if a predetermined value is not reached.

When the UV-radiator 16 illuminates the drinking water 8 with its UV-radiation that passes through the cladding 14 and the deposit 28 adhering to the surface 26 thereof, the two UV-sensors 18, 20 measure different attenuation characteristics due to their different conical ranges of vision 22, 24. The attenuation characteristics depend on the UV-transmission of the drinking water 8, i.e., on a liquid attenuation characteristic, as well as on an aging characteristic that is caused by the aging of the UV-radiator and the diminishing UV-radiation intensity associated therewith. The aging characteristic naturally may also include other characteristics that diminish the UV-radiation intensity such as, for example, deposits 28 on the surface 26 of the cladding 14, turbidities, material defects, etc. Based on the measured values transmitted by the UV-sensors 18, 20, the evaluation unit 32 may determine a UV-radiation intensity that is emitted from the deposit 28 and reaches the drinking water 8, wherein this UV-radiation intensity is not dependent on the UV-transmission of the drinking water 8. Consequently, a maintenance plan for the UV-radiator/cladding combination may be prepared in dependence on the respectively determined UV-illumination intensity.

Figure 2:
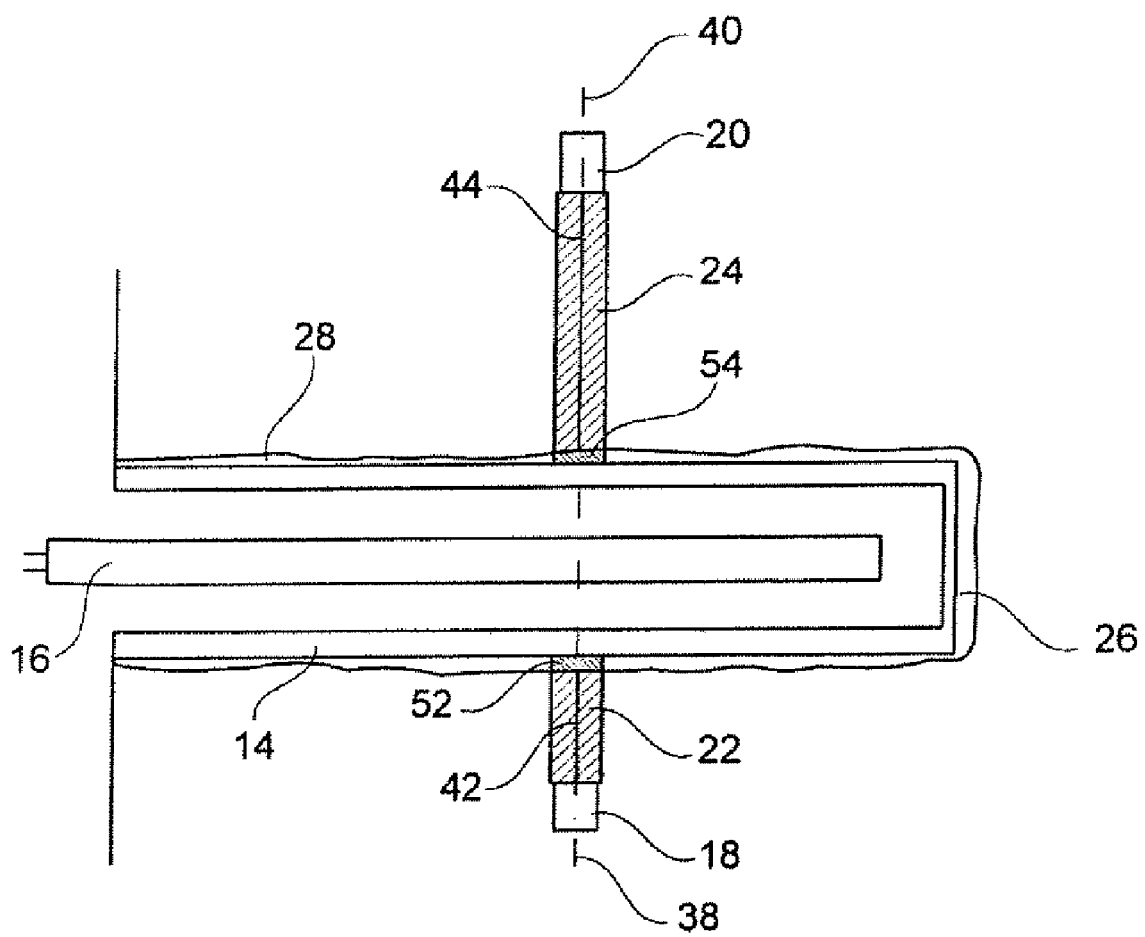

FIG. 2 schematically shows a second arrangement of two UV-sensors 18, 20 relative to the surface 26 of the cladding 14 of a UV-radiator 16 that is coated with a deposit 28. The first UV-sensor 18 has a first optical axis 38 and the second UV-sensor 20 has a second optical axis 40. The two UV-sensors 18, 20 are oppositely arranged relative to the cladding 14 in such a way that the first optical axis 38 coincides with the second optical axis 40. In addition, the first UV-sensor 18 is spaced apart by a first distance 42 and the second UV-sensor 20 is spaced apart by a second distance 42. In this case, the first distance 42 is smaller than the second distance 44. Due to the different distances 42, 44 of the two UV-sensors 18, 20 of otherwise identical construction, the two UV-sensors 18, 20 have different conical ranges of vision 22, 24 and measure different attenuation characteristics, based on which the evaluation unit 32 may calculate the UV-radiation intensity currently originating from the deposit 28 in connection with the set of characteristic curves. In order to also allow a simpler calculation that is based on linear geometries, the UV-sensors 18, 20 are designed in such a way that the conical ranges of vision 22, 24 are realized in the form of parallel straight circular cylinders.

It would naturally also be possible to arrange the UV-sensors 18, 20 in this and the following figures such that the conical ranges of vision 22, 24 cover at least approximately congruent sections on the cladding 52, 54.

Figure 3:
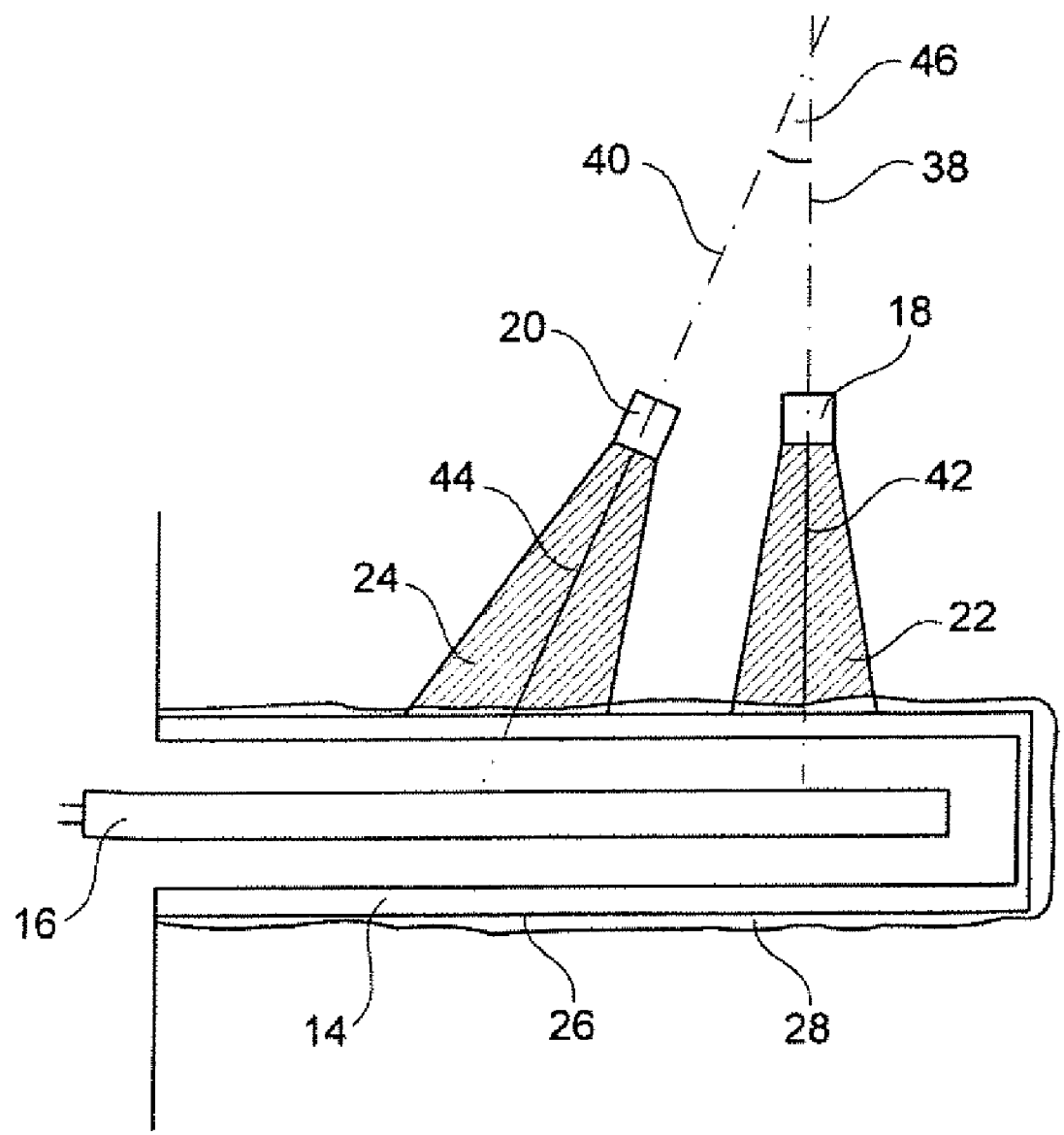

FIG. 3 schematically shows a third arrangement of two UV-sensors 18, 20 relative to the surface 26 of the cladding 14 of a UV-radiator 16 that is coated with a deposit 28. The two UV-sensors 18, 20 are equidistantly spaced apart from the cladding 14, but their optical axes 38, 40 include such an angle 46 that the first distance 42 of the first UV-sensor 18 is smaller than the second distance 44 of the second UV-sensor 20. Due to the different distances 42, 44 of the two UV-sensors 18, 20 of otherwise identical construction, the two UV-sensors 18, 20 have different conical ranges of vision 22, and consequently measure different attenuation characteristics, based on which the evaluation unit 32 calculates the UV-radiation intensity that currently originates from the deposit 28 in connection with the set of characteristic curves.

Figure 4:
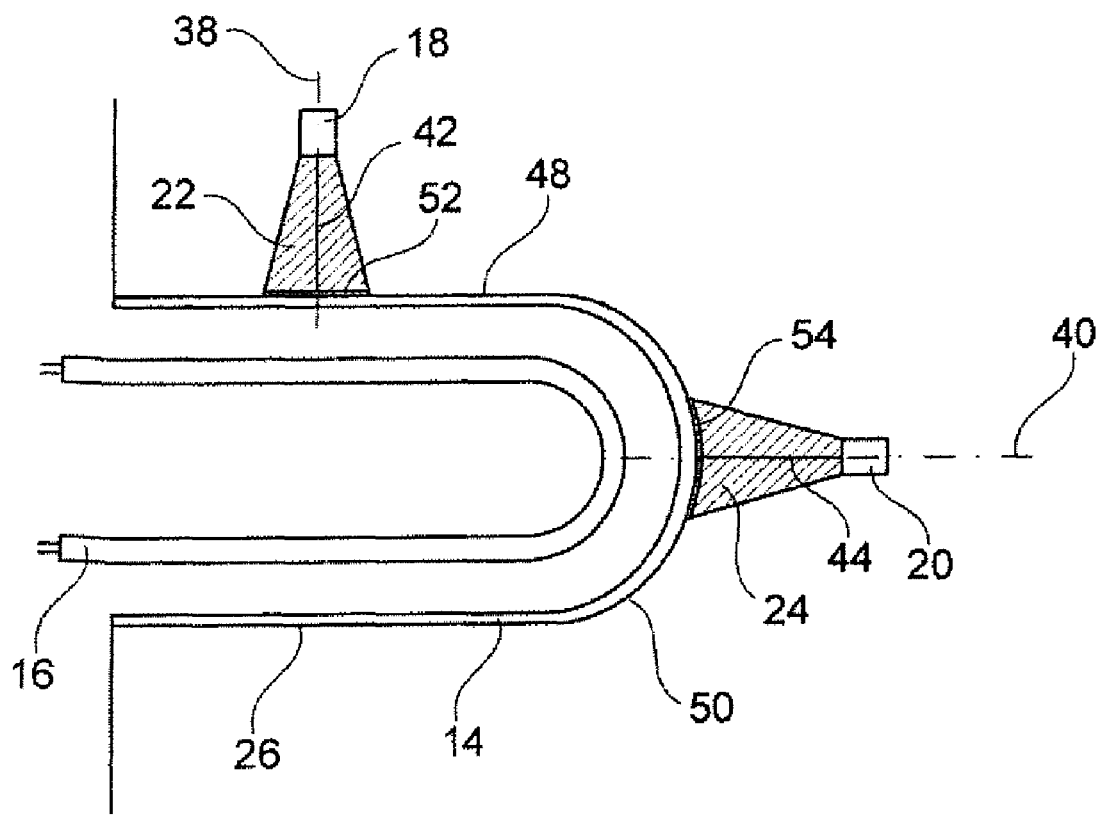

FIG. 4 schematically shows a fourth arrangement of two UV-sensors 18, 20 relative to the surface 26 of the cladding 14 of an UV-radiator 16 that is not coated with a deposit 28 in this case so as to better understand the arrangement. The cladding 14 is divided into a first part 48 and a second part 50. The first part 48 corresponds to a straight tube or, in more general terms, a cladding with a curvature, wherein the edge of the straight tube borders on the second part 50 that corresponds to a curved tube or a curved cladding, respectively. The two UV-sensors 18, 20 are spaced apart from the surface 26 of the cladding 14 by identical distances 42, 44 and their optical axes 38, 40 are directed perpendicular to the surface 26. The first conical range of vision 22 of the first UV-sensor 18 covers the first section 52 of the surface 26 of the first part 48 and the second conical range of vision 24 of the second UV-sensor 20 covers the second section 54 of the surface 26 of the second part 50. Although the conical ranges of vision 22, 24 of the two UV-sensors 18, 20 are identical, the covered sections 52, 54 differ from one another. The first section 52 forms part of a straight tube and therefore is curved one-dimensionally. The second section 54 forms part of a curved tube and therefore is curved two-dimensionally. Consequently, the surface of the second section 54 is larger than the surface of the first section 52. The two UV-sensors 18, 20 therefore measure different attenuation characteristics, based on which the evaluation unit 32 may calculate the UV-radiation intensity that currently originates from the surface 26 in connection with the set of characteristic curves.

Figure 5:
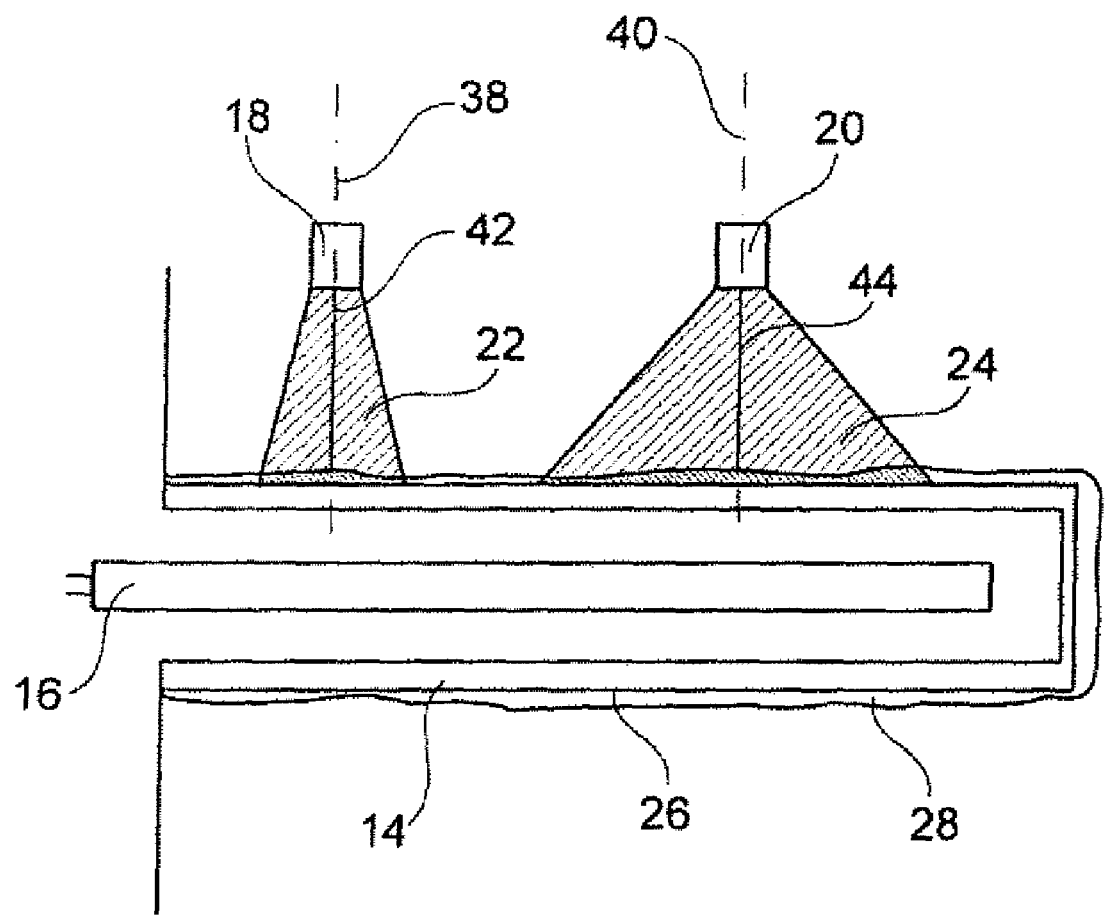

FIG. 5 schematically shows a fifth arrangement of two UV-sensors 18, 20 relative to the surface 26 of the cladding 14 of a UV-radiator 16 that is coated with a deposit 28. The two UV-sensors 18, 20 are spaced apart from the surface 26 of the cladding 14 by identical distances 42, 44 and their optical axes 38, 40 are aligned perpendicular to the surface 26 and parallel to one another. However, the first UV-sensor 18 operates with a smaller measuring field angle than the second UV-sensor 20. Consequently, the first conical range of vision 22 of the first UV-sensor 18 is smaller than the second conical range of vision 24 of the second UV-sensor 20. Due to the different conical ranges of vision 22, 24, the two UV-sensors measure different attenuation characteristics, based on which the evaluation unit 32 may calculate the UV-radiation intensity that currently originates from the deposit 28.

Figure 6:
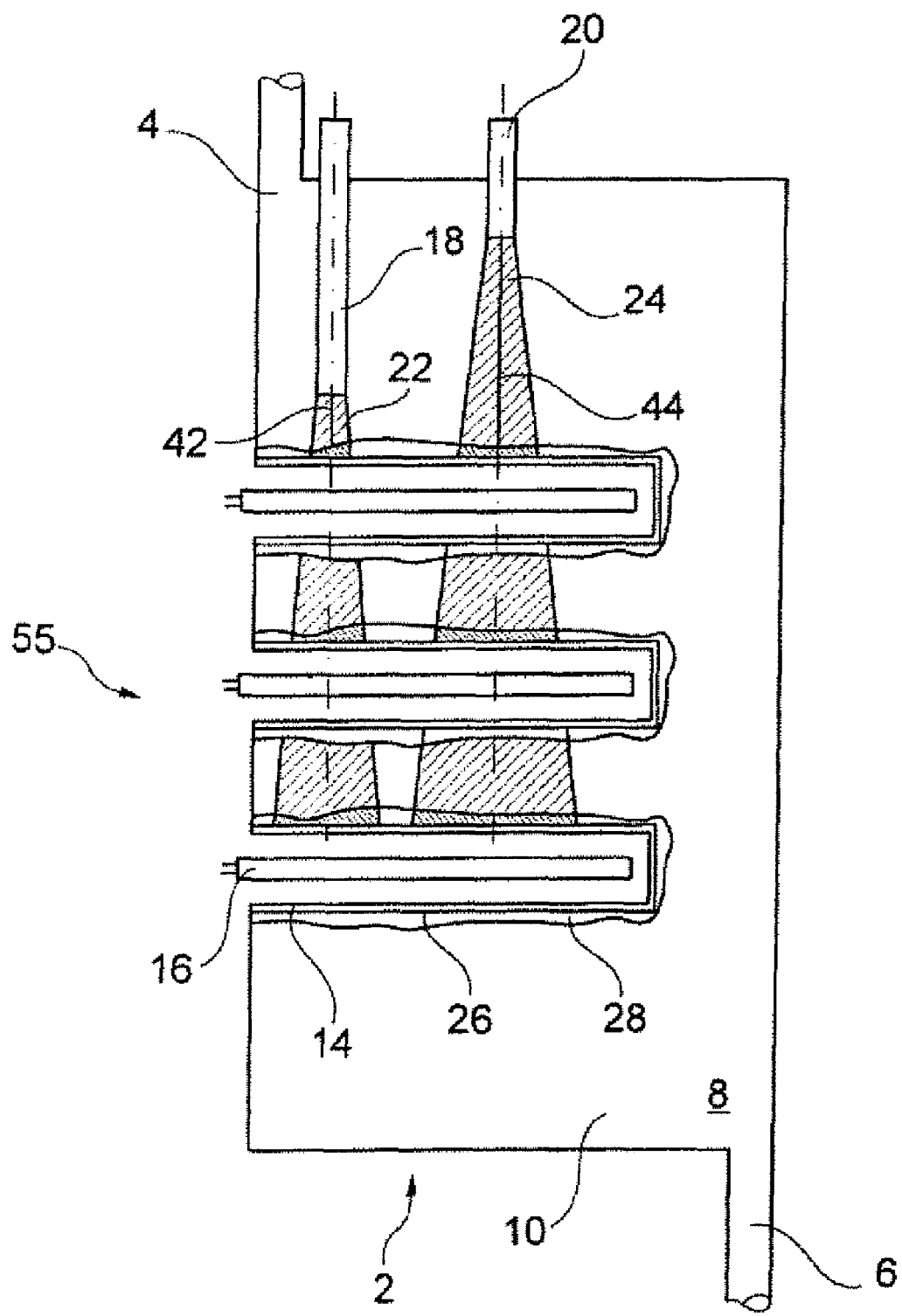

FIG. 6 schematically shows a disinfection system 2 without the control device and its evaluation and warning unit, wherein a radiator arrangement 55 with three UV-radiators 16 that are arranged on top of one another and respectively feature their own cladding 14, as well as two UV-sensors 18, 20, are arranged in the irradiation chamber 10. The arrangement of the two UV-sensors 18, 20 is already known from FIG. 1. The surfaces 26 of the claddings 14 also contain a deposit 28. The two UV-sensors 18, 20 are spaced apart from each surface 26 of the cladding 14 by a different distance 42, 44 and measure different attenuation characteristics within their conical ranges of vision 22, 24. In this case, it is possible to measure the attenuation characteristics separately for each individual UV-radiator/cladding combination or for a combination of individual UV-radiator/cladding combinations or jointly for all UV-radiator/cladding combinations. Consequently, the radiation intensity that currently originates from the deposit 28 may be determined for each individual UV-radiator/cladding combination regardless of the UV-transmission of the liquid to be disinfected.

Figure 7:
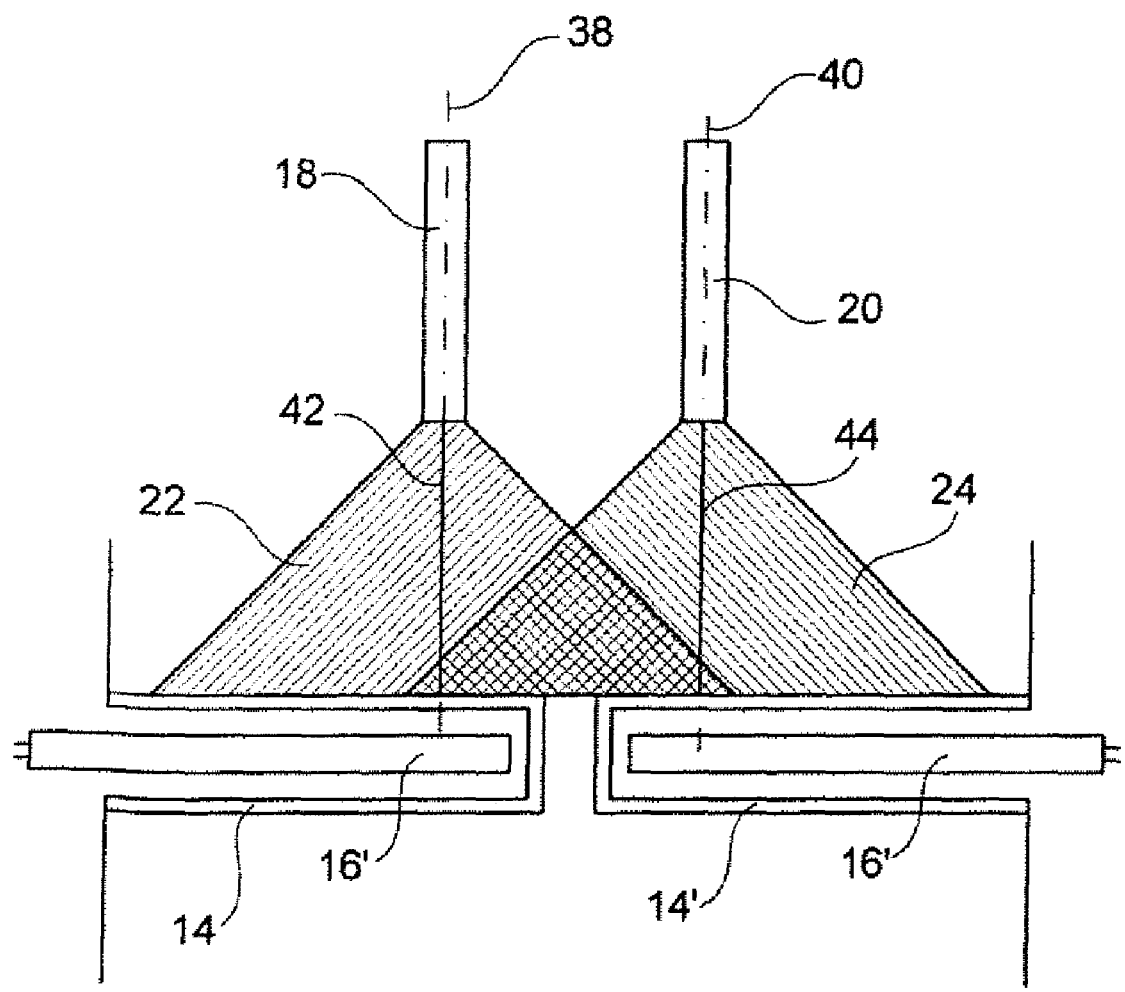

FIG. 7 schematically shows an arrangement consisting of a first UV-radiator 16 with a first cladding 14 that is arranged opposite of a second UV-radiator 16' with a second cladding 14'. In this case, the first UV-sensor 18 is arranged in a first distance 42 above the first UV-radiator 16 and the second UV-sensor 20 is arranged in a second distance 44 above the second UV-radiator 16', wherein the distances 42, have the same length. If the first UV-radiator 16 is switched on and the second UV-radiator 16' is switched off, the two UV-sensors 18, 20 respectively measure different attenuation characteristics within their conical ranges of vision 22, 24, wherein the radiation intensity that currently originates from the UV-radiator 16/cladding 14 combination may be determined based on these different attenuation characteristics. In this case, the UV-sensor records an attenuation characteristic that partially consists of direct UV-radiation and partially of indirect UV-radiation as it is created, for example, due to reflections. The radiation intensity of the first UV-radiator 16/cladding 14 combination therefore may be determined with only the two UV-sensors 18, 20. The radiation intensity of the second UV-radiator 16'/cladding 14' combination may also be determined analogously.

Figure 8:
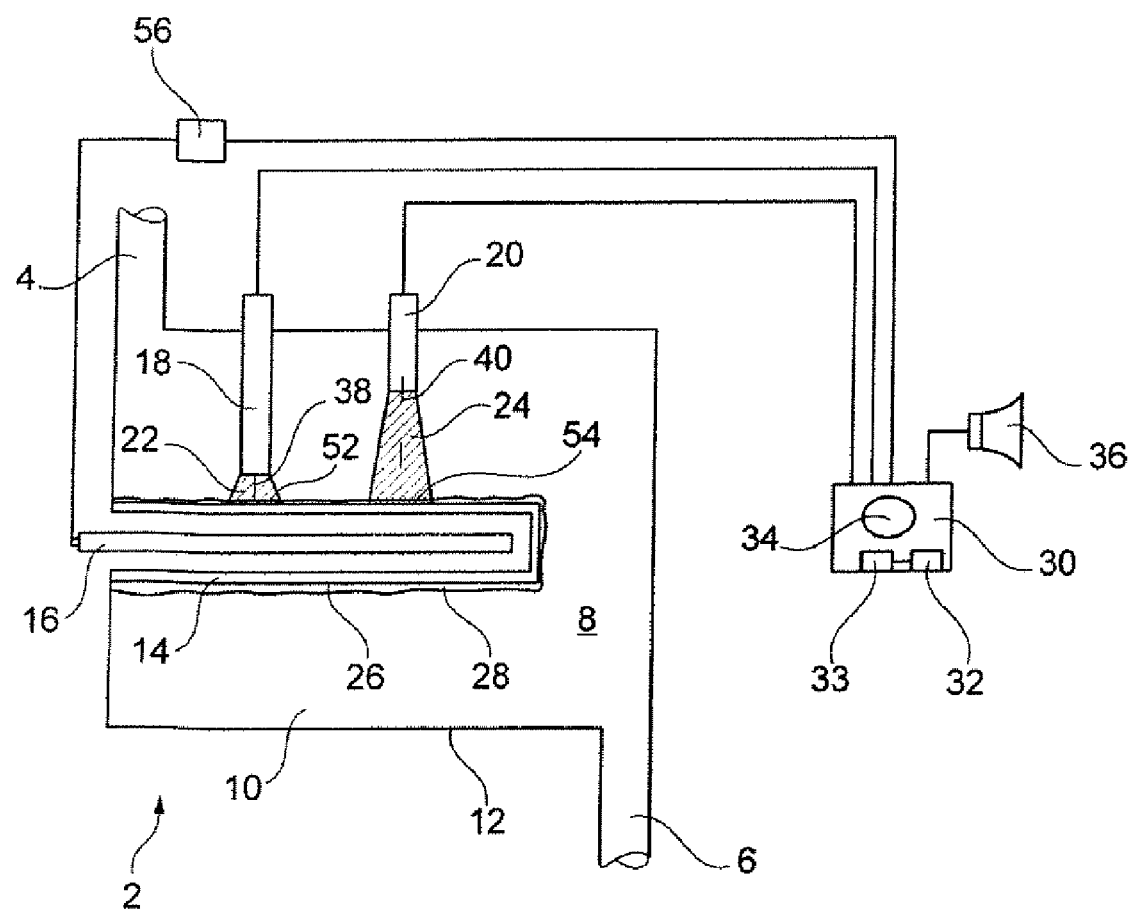
FIG. 8 shows a disinfection system according to FIG. 1 that is equipped with an additional measuring device.

FIG. 8 shows a disinfection system 2 according to FIG. 1 that is provided with an additional measuring device 56. This measuring device 56 determines the radiation emitted by the UV-radiator 16 based on the current-voltage curve of the UV-radiator 16. This measured value is transmitted to the evaluation unit 32 of the control device 30. In connection with the two measured values transmitted by the two UV-sensors 18, 20 and the set of characteristic curves, the evaluation unit 32 is able to provide conclusive information on whether it suffices during the next maintenance process to merely remove the deposit 28 from the surface 26 of the cladding 14 because the UV-radiator 16 still provides the required radiation intensity or it is also necessary to replace the UV-radiator 16 because its radiation intensity will drop below a predetermined value by the maintenance process after next due to its aging, namely regardless of the UV-transmission of the liquid 8 to be disinfected.

Figure 9:
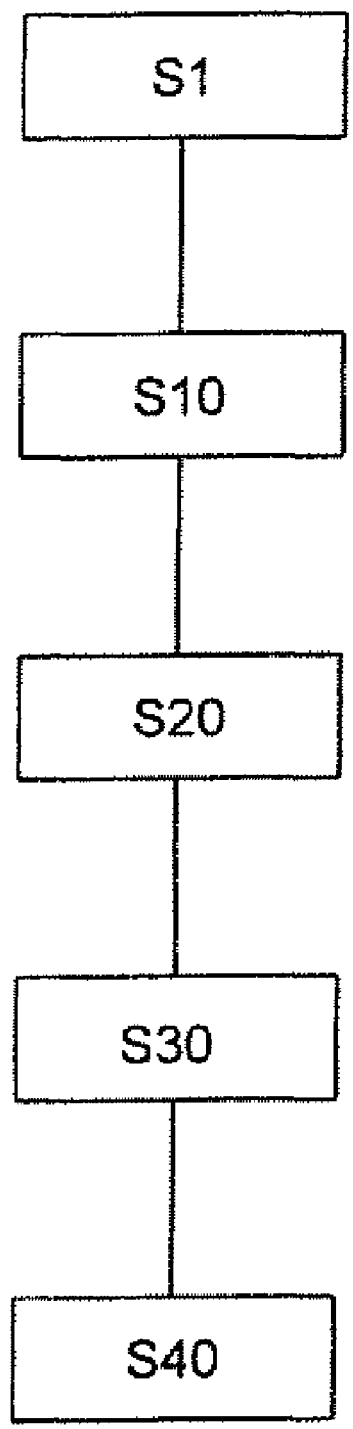
FIG. 9 shows a flow chart of a method for determining the radiation intensity emitted on the cladding of the UV-radiator.

FIG. 9 shows a flow chart of a method according to an embodiment of the invention for determining the radiation intensity emitted on the cladding of the UV-radiator. The flow chart illustrates a process sequence, in which S1 symbolizes a calibration, S10 symbolizes the introduction of the liquid 8 to be disinfected into the irradiation chamber 10, S20 symbolizes the determination of the first measured value by the first UV-sensor 18, S30 symbolizes the determination of the second measured value by the second UV-sensor 20 and 840 symbolizes the evaluation of the first and the second measured value in order to determine the first and the second aging characteristic. In contrast to the serial execution of the individual process steps shown, the determination of the two measured values S20 and S30 may also take place in a parallel fashion. The calibration mentioned under S1 serves for determining the distances of both UV-sensors from the cladding of the UV-radiator and may be carried out regularly or during commissioning only.

Figure 10:
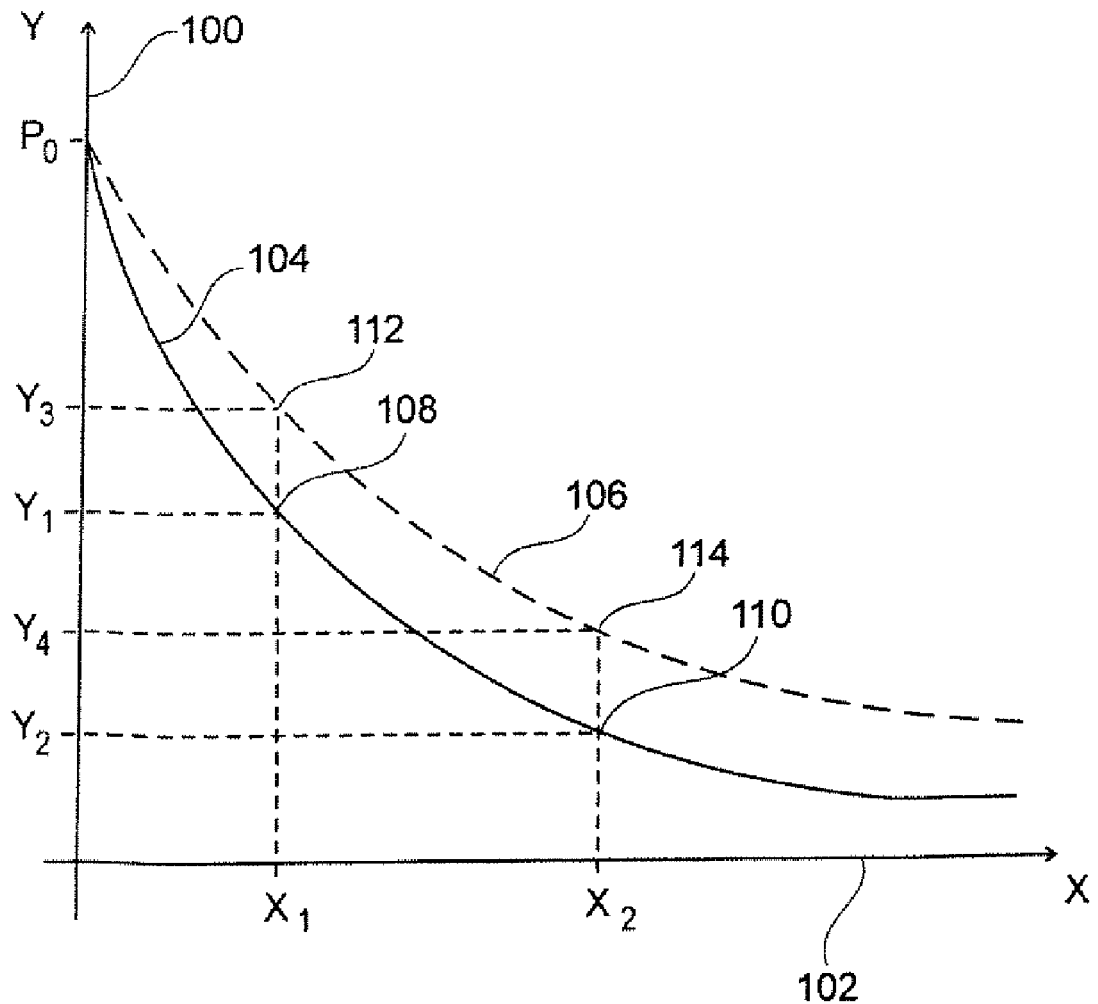
FIG. 10 shows a set of characteristic curves that contains two curves.

FIG. 10 shows the UV-radiation intensity as a function of the distance from the radiator according to Lambert-Beer's law, namely for a first UV-transmission 104 of a first liquid to be disinfected and for a second UV-transmission 106 of a second liquid to be disinfected. In this case, the radiation intensity is plotted along a y-axis 100 in a Cartesian coordinate system and the distance, from which the radiation intensity is determined, is plotted along an x-axis. The first curve 104 that is illustrated in the form of a continuous line may be distinguished from the second curve 106 that is illustrated in the form of a broken line in that the second curve 106 characterizes a higher UV-transmission. The exemplary curves 104, 106 illustrated in this figure are prepared in accordance with Lambert-Beer's law that reads as follows:

$$P(x,\epsilon)=P_0 e^{-\epsilon x}$$

wherein:
P is the radiation intensity at the distance x in dependence on the UV-transmission $\epsilon$,
$P_0$ is the radiation intensity at the distance x=0,
x is the respective distance parameter of the UV-sensor 18, 20 to the UV-radiator/cladding combination, and
$\epsilon$ is the relative UV-transmission of the liquid to be disinfected at a relevant wavelength.

The distances of the two UV-sensors 18, 20 from a UV-radiator/cladding combination are determined in connection with a liquid of predetermined UV-transmission during a calibration. In this case, the first distance of the first UV-sensor 18 is identified by the reference symbol $x_1$ in the diagram and the second distance of the second UV-sensor 20 is identified by the reference symbol $x_2$ in the diagram. The evaluation unit may determine the pertinent relative illumination intensities $y_1$ and $y_2$ for the distances $x_1$ and $x_2$ from the values measured by the two UV-sensors 18, 20. The corresponding curve 104 may be definitively determined with a first intersecting point 108 of the $x_1$-line with the $y_1$-line and a second intersecting point 110 of the $x_2$-line with the $y_2$-line. This curve 104 intersects the y-axis 100 in the point $P_0$ that indicates the UV-radiation $P_0$ that originates from the UV-radiator/cladding combination and possibly is additionally reduced by the deposit 26.

Under identical conditions, but in connection with a liquid to be disinfected that has a lower UV-transmission, the evaluation unit determines a relative illumination intensity $y_3$ belonging to the first distance $x_1$ and a relative illumination intensity $y_4$ belonging to the second distance $x_2$ from the attenuation characteristics determined by the two UV-sensors. The corresponding curve 106 may be definitively determined via a third intersecting point 112 of the $x_1$-line with the $y_3$-line and via a fourth intersecting point 114 of the $x_2$-line with the $y_4$-line. This curve 106 intersects the Y-axis 100 in the same point as the curve 104. Consequently, the UV-radiation $P_0$ that originates from the UV-radiator/cladding combination and possibly is additionally reduced by the deposit 26 may be determined regardless of the UV-transmission of the liquid 8 to be disinfected by utilizing the two UV-sensor 18, 20.

If a set of characteristic curves is used, the corresponding UV-radiation intensity $P_0$ emitted by the UV-radiator/cladding combination is determined based on the first UV-radiation intensity $y_1$ determined by the first UV-sensor and the second UV-radiation intensity $y_2$ determined by the second UV-sensor.

Figure 11:
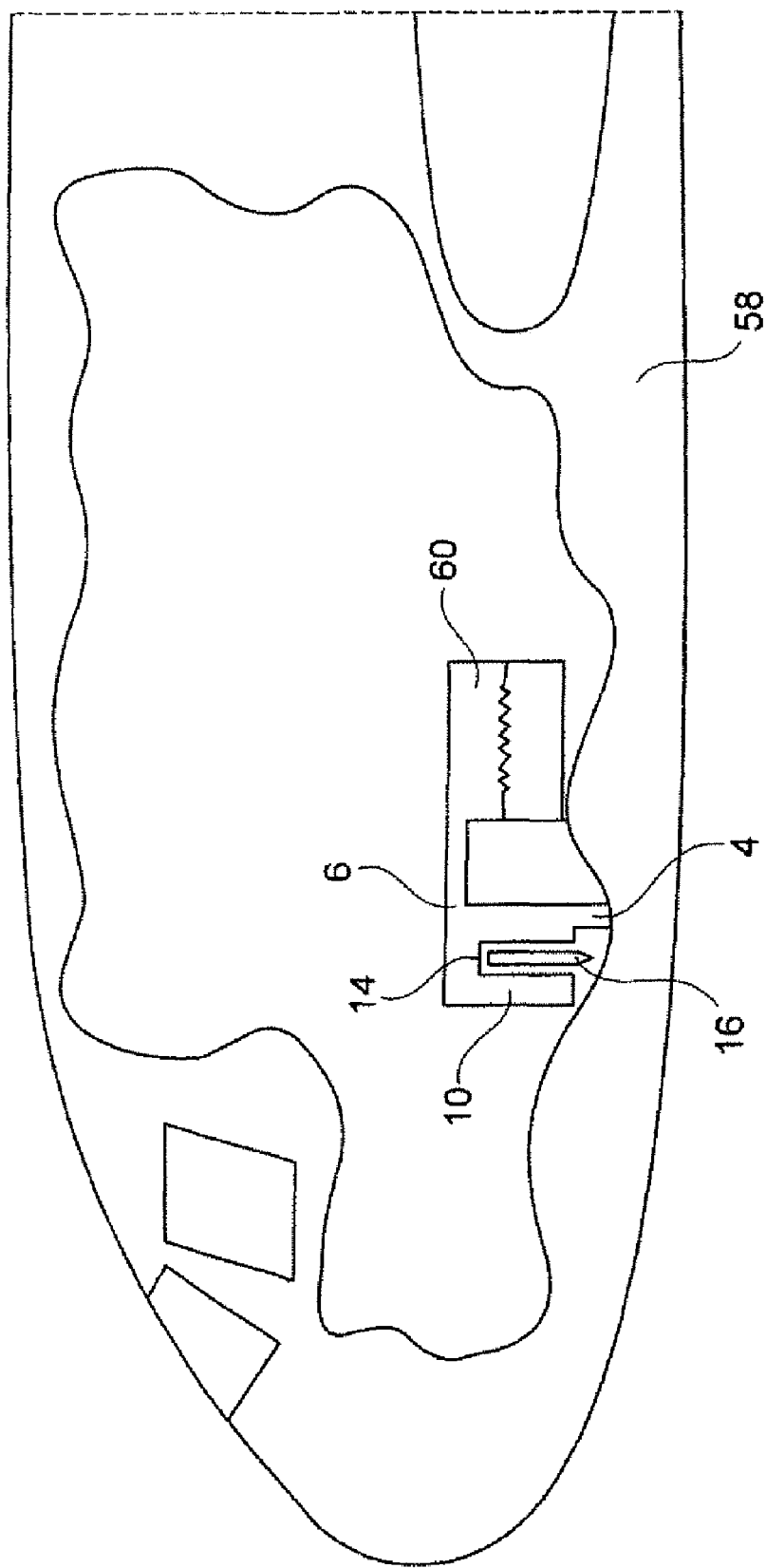
FIG. 11 shows an aircraft with an inventive disinfection system.

FIG. 11 shows an aircraft 58 with an inventive disinfection system 2. In this case, the fresh water 8 of the aircraft 58 is replenished during a stopover thereof. The fresh water 8 to be disinfected is admitted into the irradiation chamber 10 through the inlet 4. After the disinfection, the fresh water is conveyed into the fresh water tank 60 of the aircraft 58 through the outlet 6 and subsequently is available to the passengers on board the aircraft as sterile drinking water during the flight.

It should also be noted that the term "comprising" does not exclude other elements or steps and that "an" or "a" does not exclude a plurality. It should furthermore be noted that characteristics or steps that were described with reference to one of the above embodiments may also be used in combination with other characteristics or steps of other above-described embodiments. The reference symbols in the claims should not be construed as limiting the scope of the claims.

LIST OF REFERENCE SYMBOLS

2 Disinfection system
4 Inlet
6 Outlet
8 Liquid to be disinfected
10 Irradiation chamber
12 Wall
14 Cladding
16 UV-radiator
18 First UV-sensor
20 Second UV-sensor
22 First conical range of vision
24 Second conical range of vision
26 Surface
28 Deposit
30 Control device
32 Evaluation unit
33 Storage unit
34 Display
36 Warning device
38 First optical axis
40 Second optical axis
42 First distance
44 Second distance
46 Angle
48 First part
50 Second part
52 First section
54 Second section
55 Radiator arrangement
56 Measuring device
58 Aircraft
60 Fresh water tank
100 Y-axis
102 X-axis
104 First curve
106 Second curve
108 First intersecting point
110 Second intersecting point
112 Third intersecting point
114 Fourth intersecting point

The invention claimed is:

1. A disinfection system for liquids, the disinfection system comprising:
an irradiation chamber for accommodating a liquid to be disinfected;
a an Ultraviolet (UV)-radiator with a cladding that is transparent to UV-light;
a first Ultraviolet (UV)-sensor; and
a second Ultraviolet (UV)-sensor;
wherein the UV-radiator is arranged in the irradiation chamber such that the UV-radiation emitted by the UV-radiator penetrates the liquid to be disinfected;
wherein the first UV-sensor is arranged in the irradiation chamber such that a first attenuation characteristic with respect to the UV-light emitted by the UV-radiator is measurable with the first UV-sensor, wherein the first attenuation characteristic includes a first aging characteristic and a first liquid attenuation characteristic;
wherein the second UV-sensor is arranged in the irradiation chamber such that a second attenuation characteristic with respect to the UV-light emitted by the UV-radiator is measurable with the second UV-sensor, wherein the second attenuation characteristic includes a second aging characteristic and a second liquid attenuation characteristic; and wherein the first attenuation characteristic differs from the second attenuation characteristic.

2. The disinfection system of claim 1,
wherein the first UV-sensor is spaced apart from the cladding of the UV-radiator by a first distance;
wherein the second UV-sensor is spaced apart from the cladding of the UV-radiator by a second distance; and
wherein the first distance differs from the second distance such that a difference between the first and the second attenuation characteristic is ascertainable.

3. The disinfection system of claim 1,
wherein the first UV-sensor has a first optical axis;
wherein the second UV-sensor has a second optical axis;
wherein the first optical axis is directed to the cladding of the UV-radiator at a first angle;
wherein the second optical axis is directed to the cladding of the UV-radiator at a second angle;
wherein the first angle differs from the second angle;
wherein the distance between the first UV-sensor and the cladding of the UV-radiator along the first axis differs from the distance between the second UV-sensor and the cladding of the UV-radiator along the second axis such that the difference between the first and the second attenuation characteristic is ascertainable.

4. The disinfection system of claim 1, wherein the cladding of the UV-radiator comprises:
a straight region; and
a curved region;
wherein the first UV-sensor is directed to the straight region;
wherein the second UV-sensor is directed to the curved region such that the difference between the first and the second attenuation characteristic is ascertainable.

5. The disinfection system of claim 1, wherein the cladding of the UV-radiator comprises:
a one-dimensionally curved region; and
a two-dimensionally curved region;
wherein the first UV-sensor is directed to the one-dimensionally curved region and the second UV-sensor is directed to the two-dimensionally curved region such that the difference between the first and the second attenuation characteristic is ascertainable.

6. The disinfection system of claim 1,
wherein the first UV-sensor comprises a first measuring field angle; and
wherein the second UV-sensor comprises a second measuring field angle;
wherein the first measuring field angle differs from the second measuring field angle such that the difference between the first and the second attenuation characteristic is ascertainable.

7. The disinfection system of claim 1, further comprising:
a measuring device;
wherein the measuring device is configured for determining the light intensity of the light emitted by the UV-radiator.

8. The disinfection system of claim 1, further comprising:
a control device with an evaluation unit;
wherein the evaluation unit is configured for determining an outgoing radiation intensity due to the measured values generated by the first and the second UV-sensor, and
wherein the radiation intensity is originated from the cladding of the UV-radiator that may be coated with a deposit.

9. The disinfection system of claim 8, wherein the evaluation unit comprises:
a storage unit;
wherein a set of characteristic curves for determining the radiation intensity from the cladding of the UV-radiator is stored in the storage unit.

10. The disinfection system of claim 8,
wherein the control device is configured such that a UV-radiator arrangement is controllable and switchable.

11. The disinfection system of claim 10,
wherein the evaluation unit of the control device is configured such that the radiation intensity of each UV-radiator of the UV-radiator arrangement which is provided with a cladding is ascertainable by the measured values of the first and the second UV-sensor.

12. The disinfection system of claim 8, wherein the control device comprises:
a warning device;
wherein the warning device generates a warning signal if the radiation intensity of the cladding of the UV-radiator falls below a pre-adjusted value.

13. The disinfection system of claim 8,
wherein the evaluation unit of the control device is configured for determining the UV-attenuation of a deposit situated on the cladding of the UV-radiator based on the measured values generated by the first UV-sensor, the second UV-sensor, and a measuring device designed for determining the light intensity of the light emitted by the UV-radiator.

14. An aircraft comprising a disinfection system, the disinfection system comprising:
an irradiation chamber for accommodating a liquid to be disinfected;
a UV-radiator with a cladding that is transparent to UV-light;
a first UV-sensor; and
a second UV-sensor;
wherein the UV-radiator is arranged in the irradiation chamber such that the UV-radiation emitted by the UV-radiator penetrates the liquid to be disinfected;
wherein the first UV-sensor is arranged in the irradiation chamber such that a first attenuation characteristic with respect to the UV-light emitted by the UV-radiator is measurable with the first UV-sensor, wherein the first attenuation characteristic includes a first aging characteristic and a first liquid attenuation characteristic;
wherein the second UV-sensor is arranged in the irradiation chamber such that a second attenuation characteristic with respect to the UV-light emitted by the UV-radiator is measurable with the second UV-sensor, wherein the second attenuation characteristic includes a second aging characteristic and a second liquid attenuation characteristic; and
wherein the first attenuation characteristic differs from the second attenuation characteristic.

15. A method for disinfecting liquids for an aircraft, the method comprises the steps of:
introducing a liquid to be disinfected into an irradiation chamber, in which a first Ultraviolet (UV)-sensor and a second UV-sensor, and a an Ultraviolet (UV)-radiator in a cladding being transparent to UV-light, are arranged such that the surface of the cladding is surrounded by the liquid to be disinfected;
determining a first measured value with respect to a first attenuation characteristic with the first UV-sensor, wherein the first attenuation characteristic with respect to the UV-light emitted by the UV-radiator is caused by the liquid to be disinfected, and wherein the first attenuation characteristic comprises a first aging characteristic and a first liquid characteristic;

determining a second measured value with respect to a second attenuation characteristic with the second UV-sensor, wherein the second attenuation characteristic with respect to the UV-light emitted by the UV-radiator is caused by the liquid to be disinfected, and wherein the second attenuation characteristic comprises a second aging characteristic and a second liquid characteristic and differs from the first attenuation characteristic, and evaluating the first and the second measured value in order to determine the first or second aging characteristic.

* * * * *

UNITED STATES PATENT AND TRADEMARK OFFICE
CERTIFICATE OF CORRECTION

| | |
|---|---|
| PATENT NO. | : 8,212,682 B2 |
| APPLICATION NO. | : 12/573990 |
| DATED | : July 3, 2012 |
| INVENTOR(S) | : Axel Schreiner |

It is certified that error appears in the above-identified patent and that said Letters Patent is hereby corrected as shown below:

In the Specification

Column 10, Line 3 insert --44-- immediately after 42,.

Column 10, Line 46 "840" should be replaced by --S40--.

Column 12, Line 51 "a" should be deleted.

Column 14, Line 60 "a" should be deleted.

Signed and Sealed this
Sixteenth Day of September, 2014

Michelle K. Lee
*Deputy Director of the United States Patent and Trademark Office*